Nov. 14, 1944.  T. L. BOWSER  2,362,448
CROSS BAR SWITCH SYSTEM
Filed Sept. 26, 1942  11 Sheets-Sheet 1

FIG. 1

INVENTOR.
T. L. BOWSER.
BY Winfred T. Powell
ATT'Y.

Nov. 14, 1944. T. L. BOWSER 2,362,448
CROSS BAR SWITCH SYSTEM
Filed Sept. 26, 1942 11 Sheets-Sheet 3

FIG.3

INVENTOR.
T. L. BOWSER
BY Winfred T. Powell
ATT'Y.

FIG. 4

INVENTOR.
T. L. BOWSER.
BY Winfred T. Powell
ATT'Y.

Nov. 14, 1944.                T. L. BOWSER                2,362,448
                          CROSS BAR SWITCH SYSTEM
                     Filed Sept. 26, 1942      11 Sheets-Sheet 6

FIG. 6

INVENTOR.
T. L. BOWSER.
BY Winfred T. Powell
ATT'Y.

FIG. 9

INVENTOR.
T. L. BOWSER
BY Winfred T. Powell
ATT'Y.

Nov. 14, 1944.   T. L. BOWSER   2,362,448
CROSS BAR SWITCH SYSTEM
Filed Sept. 26, 1942   11 Sheets-Sheet 11

INVENTOR.
T. L. BOWSER.
BY Winfred T. Powell
ATT'Y.

Patented Nov. 14, 1944

2,362,448

UNITED STATES PATENT OFFICE 2,362,448

CROSSBAR SWITCH SYSTEM

Theron Lorimer Bowser, Rochester, N. Y., assignor to The Stromberg-Carlson Telephone Manufacturing Company, Rochester, N. Y., a corporation of New York Application September 26, 1942, Serial No. 459,764

11 Claims. (Cl. 179—27.54)

This invention relates to telephone systems and particularly to systems of the type in which automatic switching equipment is used for the establishment of connections.

The objects of the invention are to improve telephone systems of this character by the use of simple, reliable and efficient switching and connecting devices, to provide a flexible arrangement of the lines and link or trunk circuits to secure an efficient use of common switching equipment for both originating and terminating calls.

The invention relates in general to automatic or dial telephone systems designed for use in small areas and the numerous features to be described and claimed herein are illustrated in a system employing a single three-dimensional cross-bar switch as the switching medium, both for providing line finder operations and final selecting operations between calling and called lines.

The main feature of the present invention is the use of a single three-dimensional cross-bar switch for providing automatic interconnections from and to calling lines in a 100-line group, for example, by way of common link circuits, five for example.

Another feature of the present invention is the provision of a common discriminator circuit for determining that the line finder connecting portion of the cross-bar switch operates to connect a calling line to an idle link and that the line connector mechanism of the same cross-bar switch operates to connect this link to the called line in accordance with the called line designations as set up on the counting relay registers by means of the calling dial.

Still another feature of the present invention is the provision of common connector control circuits, for example 2, which register the digits of the called line number, transfer this registration to the connecting portion of the cross-bar switch and then are released for use in handling other calls.

Still a further feature of the present invention is the provision of an all-relay type discriminator, allotters and counters, operating in cooperation with the single three-dimensional cross-bar switch for providing the necessary functions of a small dial system.

The foregoing and other features will be described more fully in detail and the novel features of the invention will be set forth in the appended claims. For a clearer understanding of the invention, the circuits embodying it have been shown in the accompanying drawings in which:

The upper portion of Fig. 5 shows the connector control allotter.

It is believed that the operation of this system will be best understood by assuming that a single three-dimensional cross-bar switch provides automatic service for a group of 100 lines and that five link circuits are sufficient for handling simultaneous ringing and talking connections for this group of lines. It will be assumed that two connector control circuits are sufficient to handle simultaneous dialing connections for this group of lines since these circuits are only used during the dialing operation.

With the above general explanation, it will now be assumed that a call is originated at sub-station 12 on line #12 and that #22 is dialed for establishing a connection with sub-station 22 on line #22.

*Calling line identification and selection*

Figure 1:
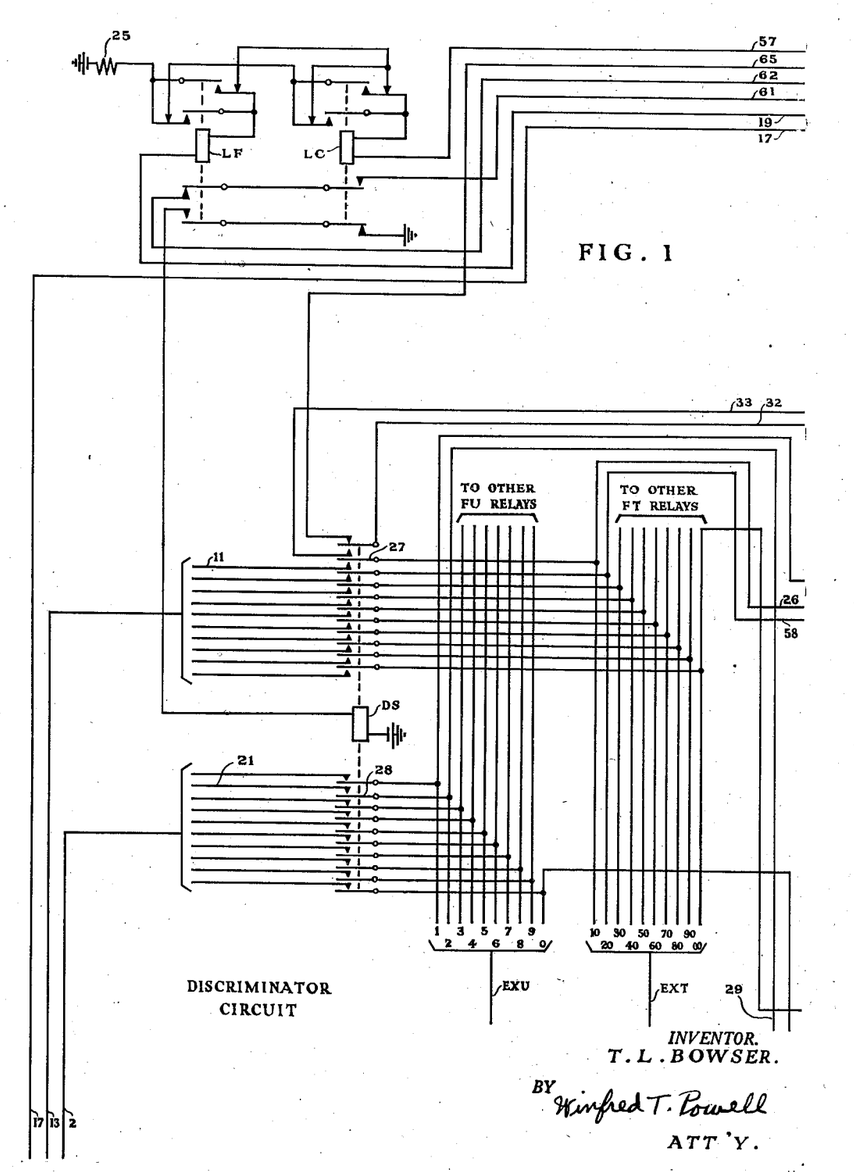
Fig. 1 shows the circuit of the discriminator which is for the purpose of discriminating in the cross-bar switch between an incoming and an outgoing call.
Figure 2:
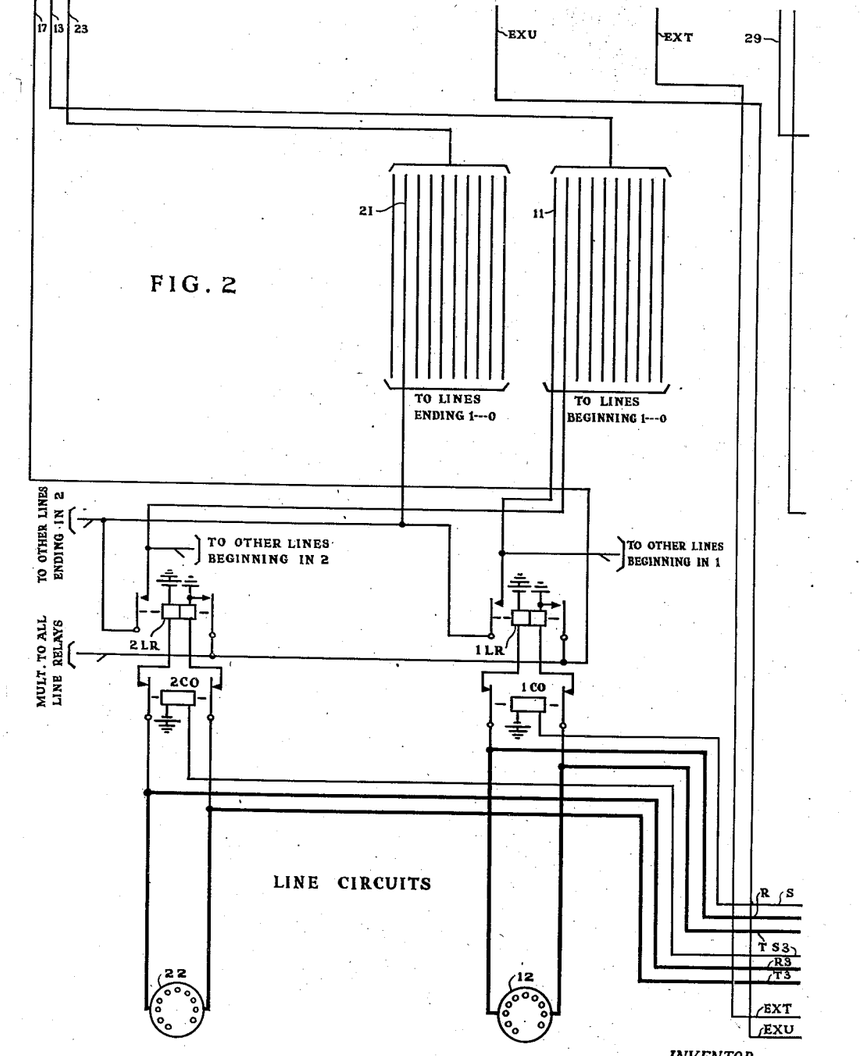
Fig. 2 shows two line circuits, one of which will be referred to as the calling line and the other as the called line in describing the operation of the system.

When the sub-station circuit is closed on line #12, line relay ILR is operated over a circuit extending from ground, right hand winding of relay ILR, right hand back contact of cut-off relay ICO, over the calling line and sub-station in series, left-hand back contact of relay ICO and left-hand winding of relay ILR to battery. The operation of relay ILR closes a circuit for operating line finder relay LF of the discriminator which extends from ground, right-hand front contact of relay ILR, conductor 17, back contact of any LB relay of the link allotter which is normal, conductor 18, back contact of any CB relay of the connector control allotter which is normal, conductor 19, winding of relay LF, outer upper back contact of relay LF, inner upper back contacts of relays LC and LF and resistance 25 to battery. It will be understood that the operation of any line relay closes this same circuit for operating relay LF as long as there is an idle link allotter and an idle connector control allotter, as evidenced by some one LB relay and some one CB relay being normal and as long as the line connector relay LC of the discriminator circuit is normal, the latter indicating that no terminating connection is being established to a called line at this time. The operation of relay LF closes a locking circuit for itself including resistance 25 and its make-before-break contacts, these make-before-break contacts also opening up the circuit of the LC relay so that a terminating connection cannot be made at this same time. Relay LF closes a circuit for operating relay DS which extends from ground, outer lower back contact of relay LC, outer lower front contact of relay LF and winding of relay DS to battery.

A circuit is now closed for operating tens magnet T1 and units magnet U2 of the line finder, these two magnets being operated because line #12 is calling. This circuit extends from ground, inner left-hand back contacts of magnets T1 to T0 inclusive, middle left-hand back contact and winding of magnet T1, conductor 26, front contact 27 of relay DS, conductor 11 and thence by way of this conductor (as indicated by single line 13 which shows that the ten common conductors extend from Fig. 1 to Fig. 2), left-hand front contact of relay ILR, conductor 21, front contact 28 of relay DS, conductor 29, winding of magnet U2, middle left-hand back contact of magnet U2, inner left-hand back contacts of all magnets U0 to U1 inclusive and resistance 29 to battery. It will be understood that all lines in the system having the same tens digit are connected by way of the corresponding common conductor (illustrated by line 13) and by way of the front contact of relay DS to a corresponding tens magnet of the finder, thus requiring only 10 tens magnets T1 to T0 inclusive. Similarly, all numbers in the system having the same units digit connect by way of similar common conductors (indicated by line 23) and front contacts of relay DS to corresponding units magnets U1 to U0 inclusive, 10 of which are required for a 100-line system.

The operation of magnets T1 and U2 in the line finder prepares the mechanical links of the cross-bar switch for closing the proper individual contact set for connecting the calling line to the allotted link circuit when the elevator or bank magnet is operated, as will be later described. For example, the operation of units magnet U2 locks the elevator link 175 to elevator bar 174 by means of locking pin 176. The operation of tens magnet T1 carries the contact actuating pins like 166 and including 166 into line with their associated contact sets. When magnet FL1 is operated, over a circuit to be later described, bar 174 is lifted and pin 166 is raised for operating contact set 14. It is not believed necessary to show or describe the mechanical structure of the three dimensional cross-bar switch by means of which the above functions are accomplished, since this switch is the same as disclosed in Bowser-Slaymaker application Serial No. 455,196 filed August 18, 1942, and assigned to the same assignee as the present application.

By means of the make-before-break contacts of the T and U magnets included in the above described operating circuits for these magnets, the lock-out feature is provided whereby simultaneous calling lines are prevented from operating more than one tens or more than one units bar magnet at any one time.

*Allotting circuits*

Figure 3:
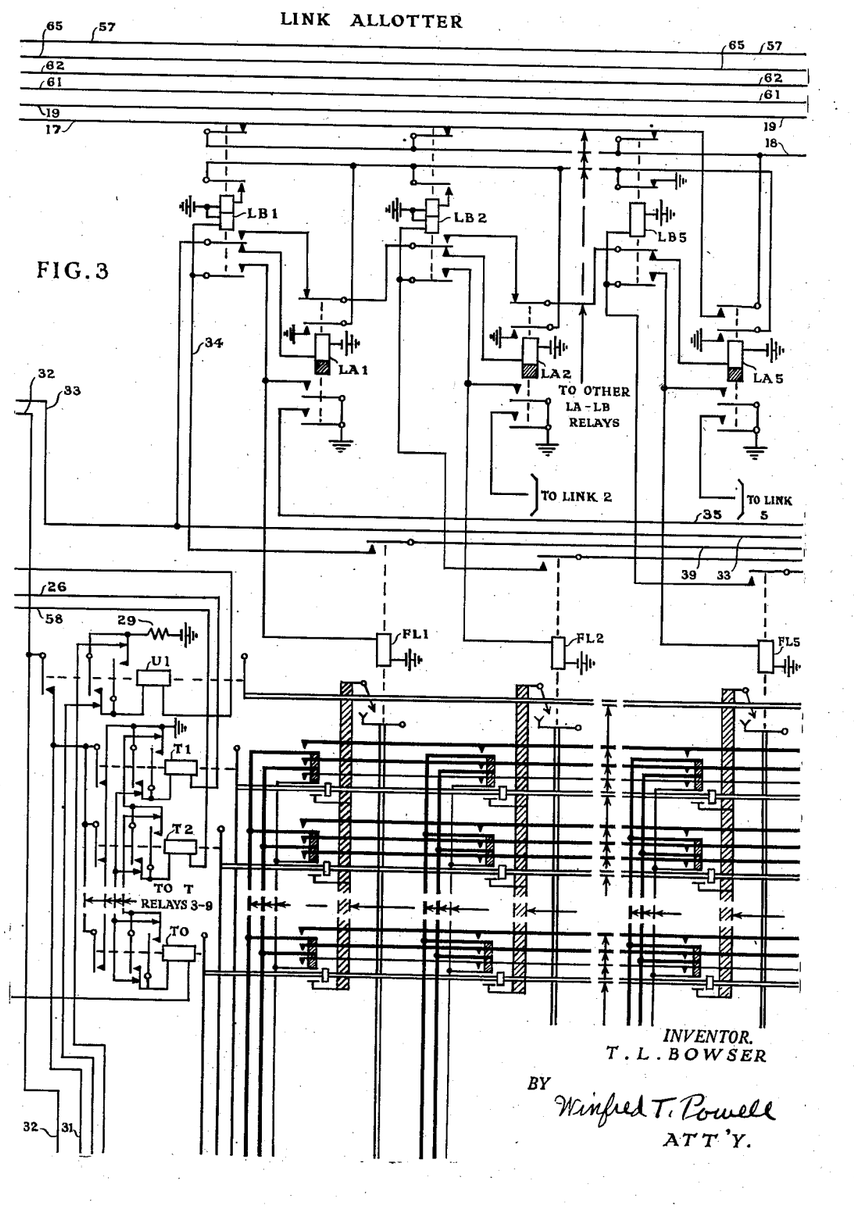
Fig. 3 is a circuit of the link allotter (top portion of the figure) and the lower portion of Fig. 3, together with the lower portion of Fig. 5 and Figs. 4 and 6, show the contact sets and diagrammatical representations of the cross-bar switch.
Figure 4:
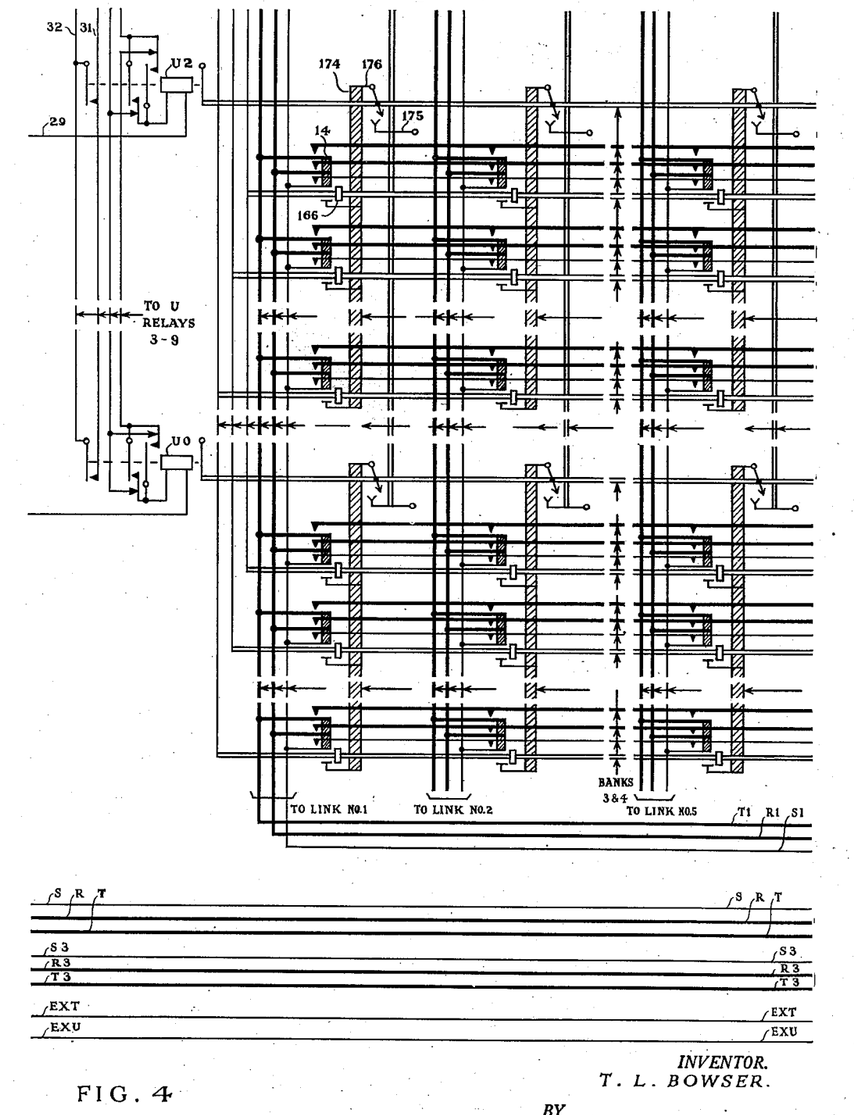
Figure 5:
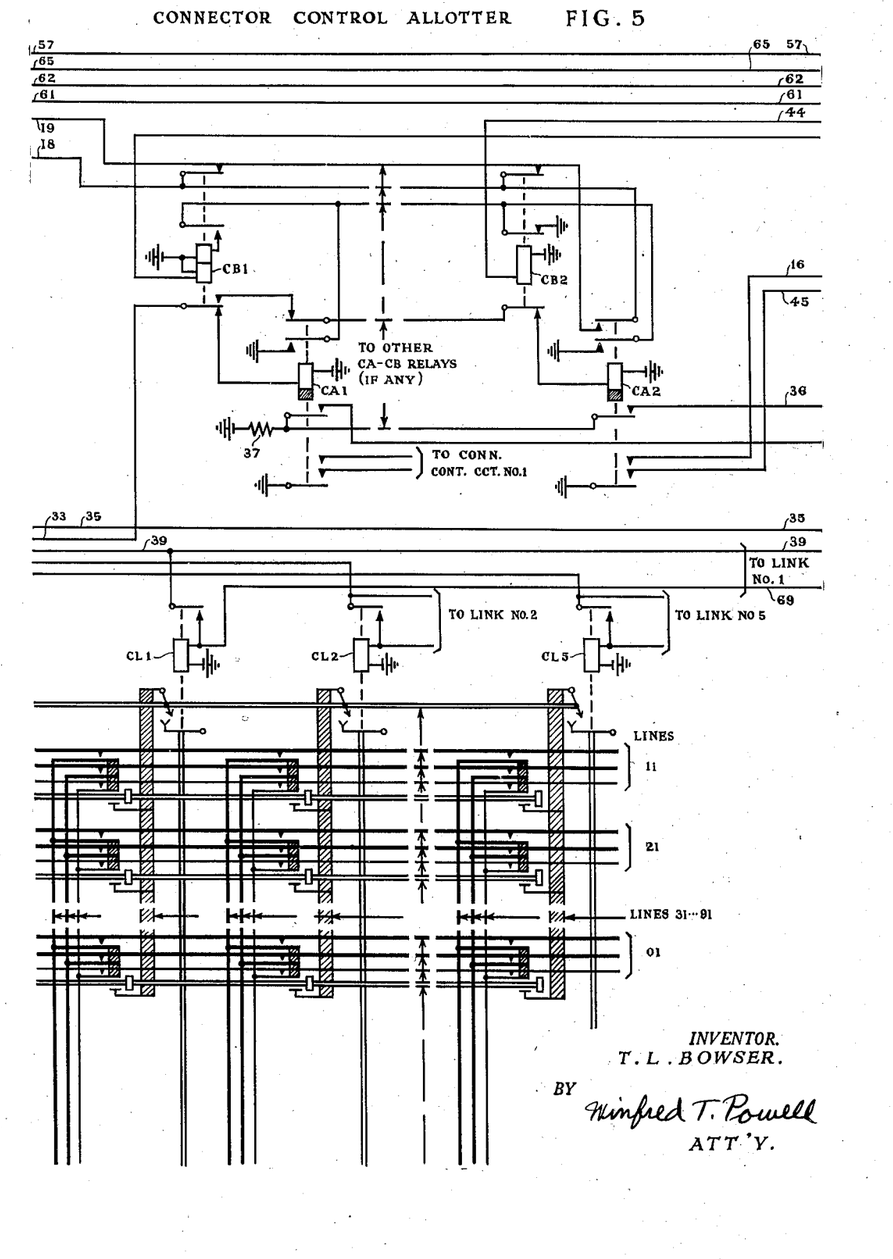
Figure 6:
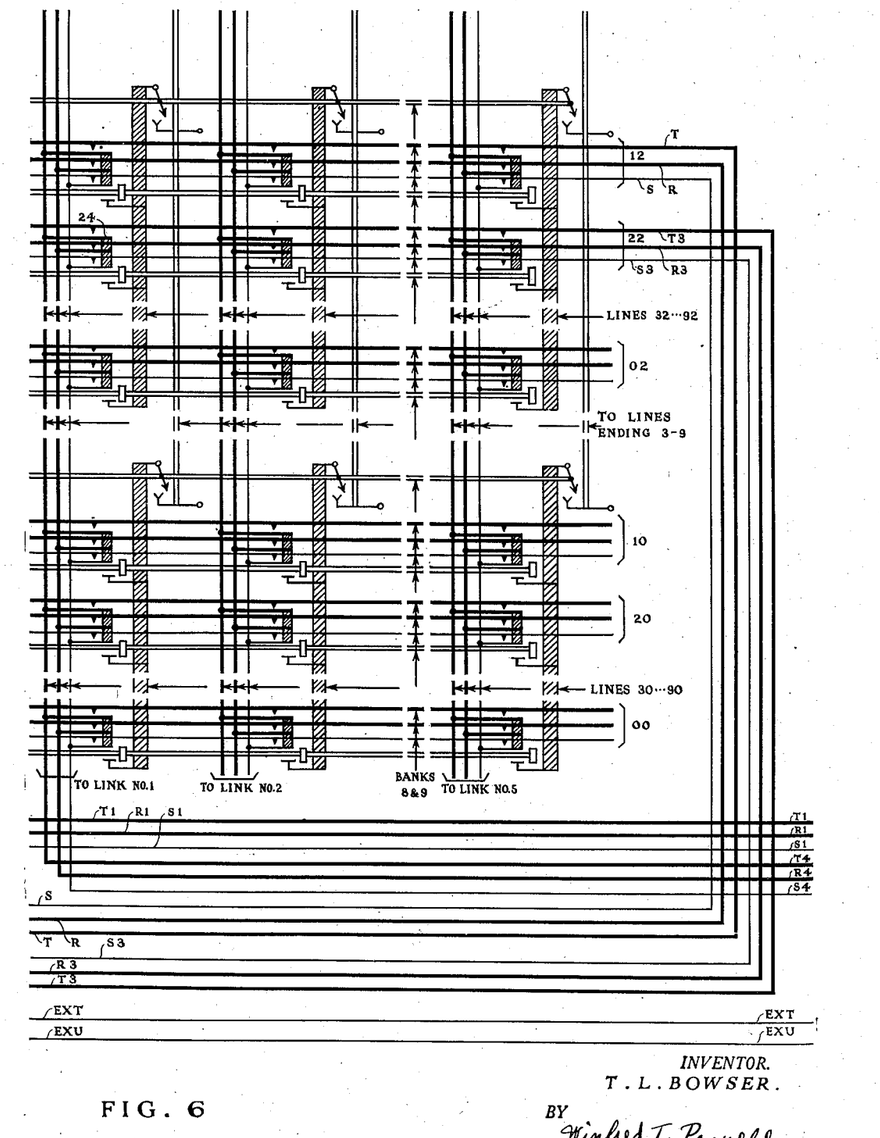

The operation of any T magnet and any U magnet in combination (T1 and U2 in the present example) completes a circuit for operating the link allotter relay LA1 which extends from ground, outer left-hand front contact of magnet T1, conductor 31, outer left-hand front contact of magnet U2, conductor 32, front contact of relay DS, conductor 33, lower back contact of relay LB1 and winding of relay LA1 to battery. A circuit is also closed for operating relay CA2 of the connector control allotter (assuming that the #1 connector control allotter is busy and that the #2 connector control allotter is idle) which extends from ground over the above described circuit to conductor 33, lower front contact of relay CB1, outer upper back contact of relay CA1, lower back contact of relay CB2 and winding of relay CA2 to battery.

It will now be pointed out how the control of the allotment of the link circuits and the connector control circuits is effected whereby the links and control circuits are allotted in rotation from the first to the last, maintaining this sequence even though links or connector control circuits become idle before the last one is selected. It was assumed that link #1 was allotted for the call and that ground on conductor 33 operated relay LA1. When the final selection is made in the switch structure, ground will be extended back on conductor 34 for operating relay LB1 as will be later described. The operation of relay LB1 opens up the circuit of relay LA1 which allows this latter relay to release after a slight delay due to its slow-acting characteristics and extend conductor 33 by way of a front contact of relay LB1 and a back contact of relay LA1 to allotter relay LB2. Consequently, the next call which applies ground to conductor 33 will effect the operation of relay LA2, then when link #2 is seized, relay LB2 will operate to transfer the circuit including conductor 33 to the next LB relay. As the successive links are allotted on successive calls, the LB relays are operated and are locked by means of their upper front contacts and their upper windings to ground at the inner upper back contact of the last LB relay, in this disclosure relay LB5 since it is assumed that there are 5 links in the system.

At the termination of any connection, the operating ground from the link is removed from the lower winding of the corresponding LB relay but the locking ground from the upper back contact of relay LB5 prevents the other LB relays from releasing until each link has been allotted in turn. When link #5 is finally allotted the LB5 relay is operated and ground is removed from the locking circuit controlling the other LB relays so that all those associated with idle links are released. In order to prevent the extension of ground on conductor 33 to a succeeding allotter circuit when the LB relay is operated and before the T and U magnets have time to release and remove this ground from conductor 33, the LA relays are made slow acting. In order to prevent the release of an LB relay if a link becomes idle (when link #5 is in use) while a succeeding link is being allotted and thus transfer the allotting circuit before the allotment is complete, each LA relay connects ground to the LB relay common locking circuit by means of its inner upper front contact as long as any LA relay is operated.

Although this allotting arrangement has been explained in connection with the link allotter, it will be understood that the same circuit arrangement is used in connection with the connector control allotter. In this case, however, it is assumed that there are only two connector control circuits and, therefore, only two sets of CA and CB relays are provided. It will further be understood that the circuit arrangement of the link and connector control allotters may be extended, in the same manner illustrated, to other LA—LB and CA—CB relays in the event that more link circuits or more connector control circuits are provided.

*Connector control circuit operation*

Figure 7:
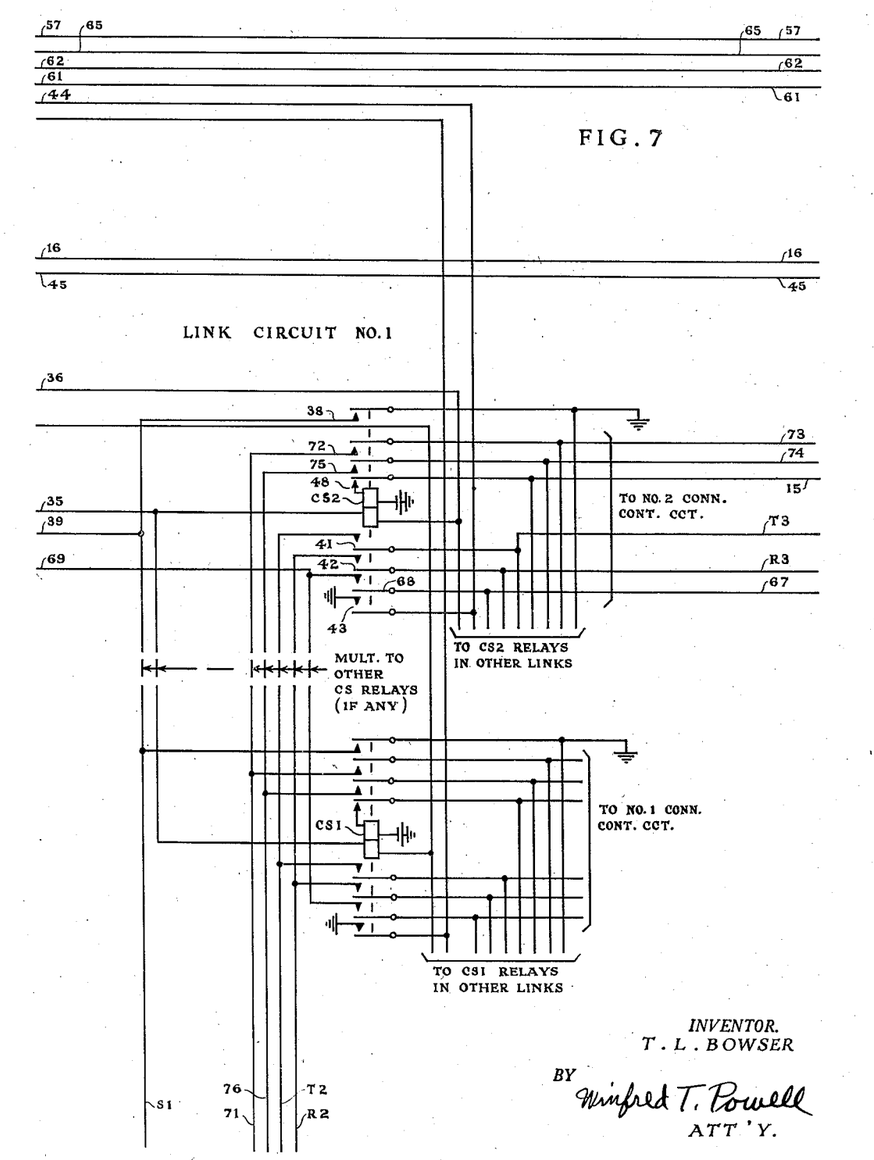
Figs. 7 and 8 show one link circuit.

With finder link #1 allotted as above described, the operation of relay LA1 closes a circuit at its inner lower front contact for operating magnet FL1. A circuit is now closed for operating relay CS2, associated with the #1 link circuit, which extends from ground, outer lower front contact of relay LA1, conductor 35, lower winding of relay CS2, conductor 36, inner lower front contact of relay CA2 and resistance 37 to battery. It will be understood that there are as many CS relays associated with each link circuit as there are connector control circuits. In the system disclosed, since there are two connector control circuits, there will be two CS relays for each link circuit. The operation of relay CS1 for example, connects link #1 to the #1 connector control circuit, the operation of relay CS2, connects link #1 to the #2 connector control circuit, etc. This is effected by having the allotter LA relay connect ground to the left-hand terminals of the lower windings of all CS relays in the link associated with the operated LA relay and by having the operated CA relay connect battery to the right hand terminals of the lower windings of all CS relays which select a particular connector control circuit. Consequently, the combination of the allotted link and the allotted connector control circuit functions to mark the particular CS relay for associating this link with this connector control circuit.

A circuit is now closed for operating relay LB1 of the link allotter which extends from ground, front contact 38 of relay CS2, conductor 39, upper front contact of magnet FL1 and lower winding of relay LB1 to battery. Relay LB1 closes the above described locking circuit for itself at its inner upper front contact. The connection of ground to conductor 39 also closes a locking circuit for magnet FL1 which includes its upper front contact and outer lower front contact of relay LB1.

Figure 9:
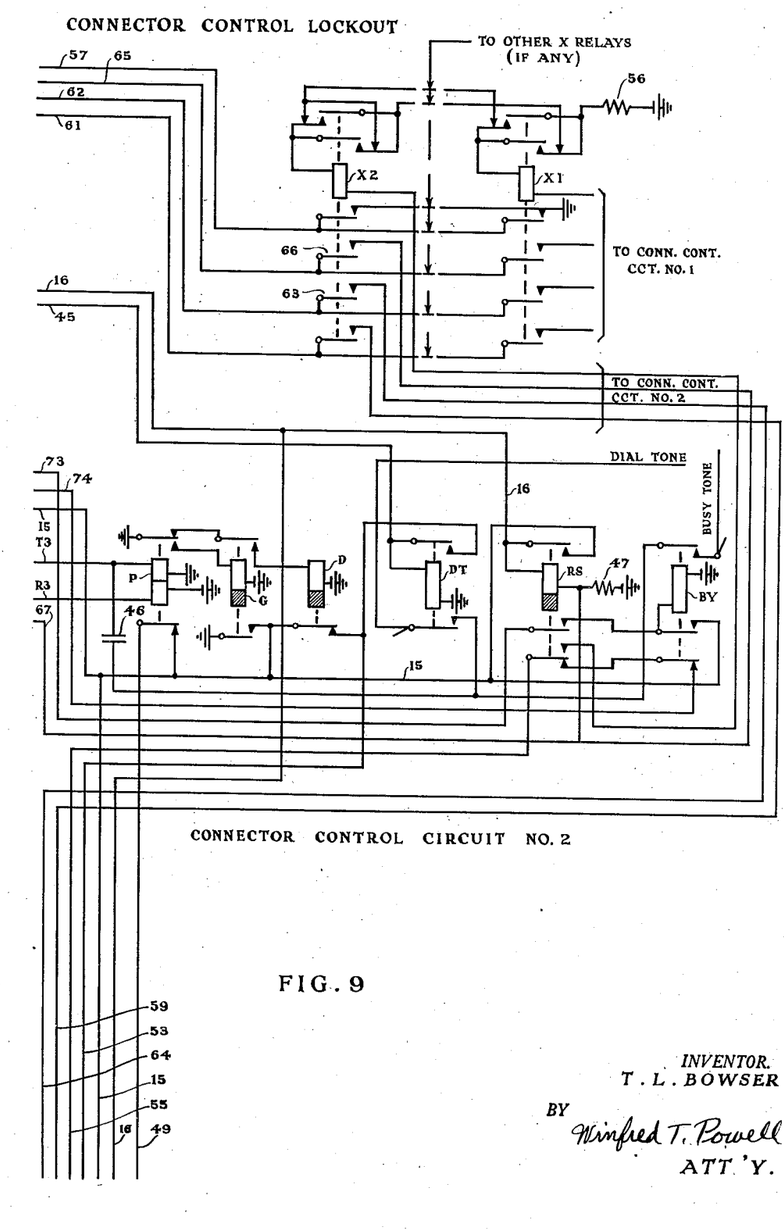
Figs. 9 and 10 show a connector control circuit, with the two relays in the upper portion of Fig. 9 showing the connector control lock-out circuit.

The operation of magnet FL1 effects the closure of contact set 14 in the finder portion of the cross-bar switch which connects the conductors T, R and S of calling line #12 to the T1, R1 and S1 conductors of link #1. The closed circuit across the line conductors of the calling line extends by way of conductors T1 and R1 to make-before-break back contacts of relay LK of the link circuit and thence by way of the make-before-break back contacts of relay R and conductors T2 and R2 through front contacts 41 and 42 of relay CS2 and conductors T3 and R3 to the windings of relay P of the #2 connector control circuit. Relay P is operated and closes a circuit at its upper front contact for operating relay G. Furthermore, relay CS2 closes a circuit from ground by way of its front contact 43 and conductor for operating relay CB2 of the connector control allotter.

Relay DT of the connector control circuit is operated before relay CA2 is released by the opening of the lower back contact of relay CB2. This circuit extends from ground, outer lower front contact of relay CA2, conductor 45 and winding of relay DT to battery. Relay DT connects the source of dial tone by way of condenser 46 to the upper winding of relay P to which the calling line is connected. At this same time a circuit is closed for operating relay RS of the connector control circuit which extends from ground, outer lower front contact of relay CA2, conductor 16, winding of relay RS and resistance 47 to battery. This ground on conductor 16 is extended down to Fig. 10 for providing a locking ground for the relays of this figure as will be later pointed out. The operation of relay G connects ground to master ground conductor 15 which extends by way of the upper front contact of relay RS to the winding of this relay for locking it operated. The ground on the master ground conductor 15 is for the purpose of providing certain locking circuits as will be later pointed out. A locking circuit is closed for relay DT which extends from conductor 15, lower back contact of relay D, upper front contact and winding of relay DT to battery.

The operation of relay G of the connector control circuit closes a locking circuit for relay CS2 of the link circuit which extends from ground, lower front contact of relay G, conductor 15, front contact 48 and upper winding of relay CS2 to battery. The operation of relay CS2 closes a circuit for operating relay ICO of the calling line which extends from ground, front contact 38 of relay CS2, conductor S1, through the finder switch contact set 14, conductor S and winding of relay ICO to battery. The operation of relay ICO opens up and releases relay ILR which in turn effects the release of relay LF by opening the right hand front contact of relay ILR. The release of relay LF opens the circuit of relay DS which also releases. Finder magnets T1 and U2 are released by the opening of the left-hand front contact of relay ILR and contact set 14 is now maintained in its operated position by means of the energization of magnet FL1.

The calling subscriber now dials the tens and units digits of the called number, which in the example assumed is #22. Before proceeding with the description of the line selecting and testing operations, a description will be given of the operation of the counting relays of the tens and units counters. It is believed that a table showing the relays operated and left operated in response to various impulses will be helpful in understanding the operation of the counter circuits. This table is shown below:

| End of impulse | K relays operated |
| --- | --- |
| 1 | K1, K2 |
| 2 | K3 |
| 3 | K1, K2, K3, K4 |
| 4 | K3, K4, K5 |
| 5 | K1, K2, K3, K4, K5, K6 |
| 6 | K4, K5, K6 |
| 7 | K1, K2, K5, K6 |
| 8 | K3, K6 |
| 9 | K1, K2, K3, K4, K6 |
| 0 | K3, K4, K6 |

Figure 10:
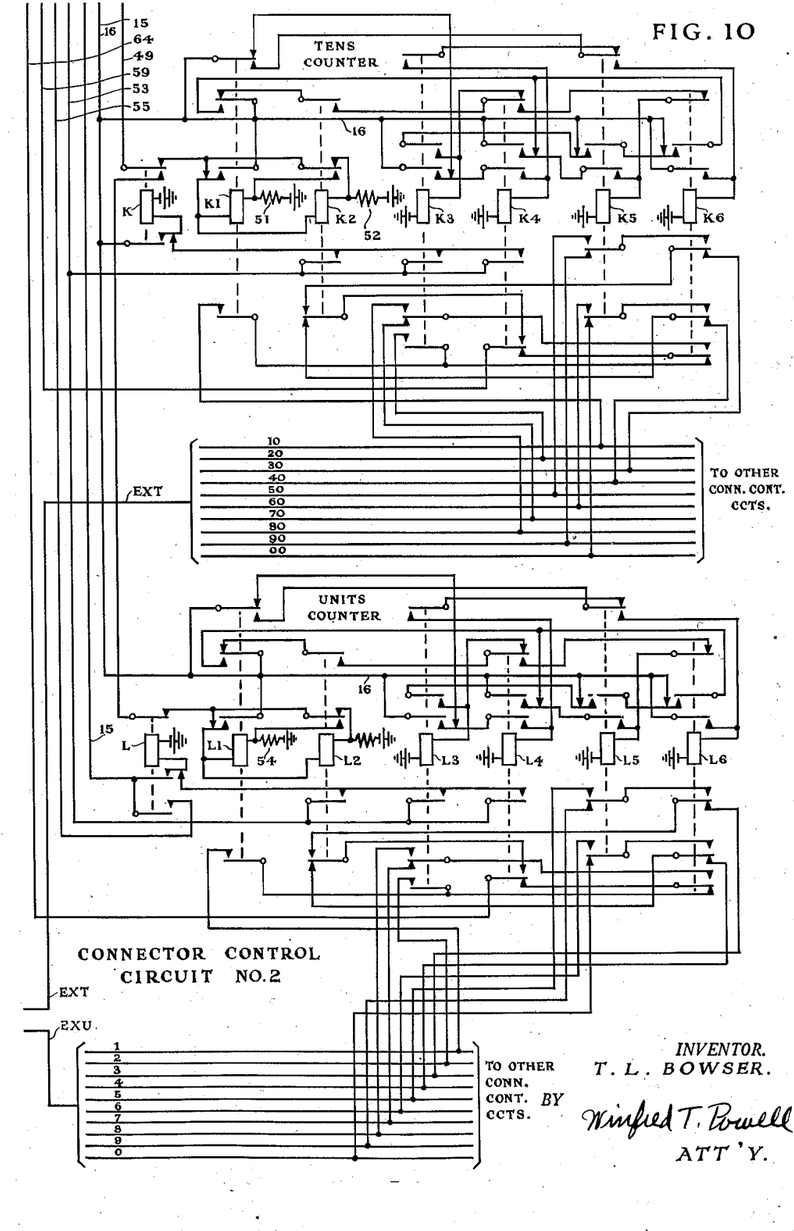
Figure 11:
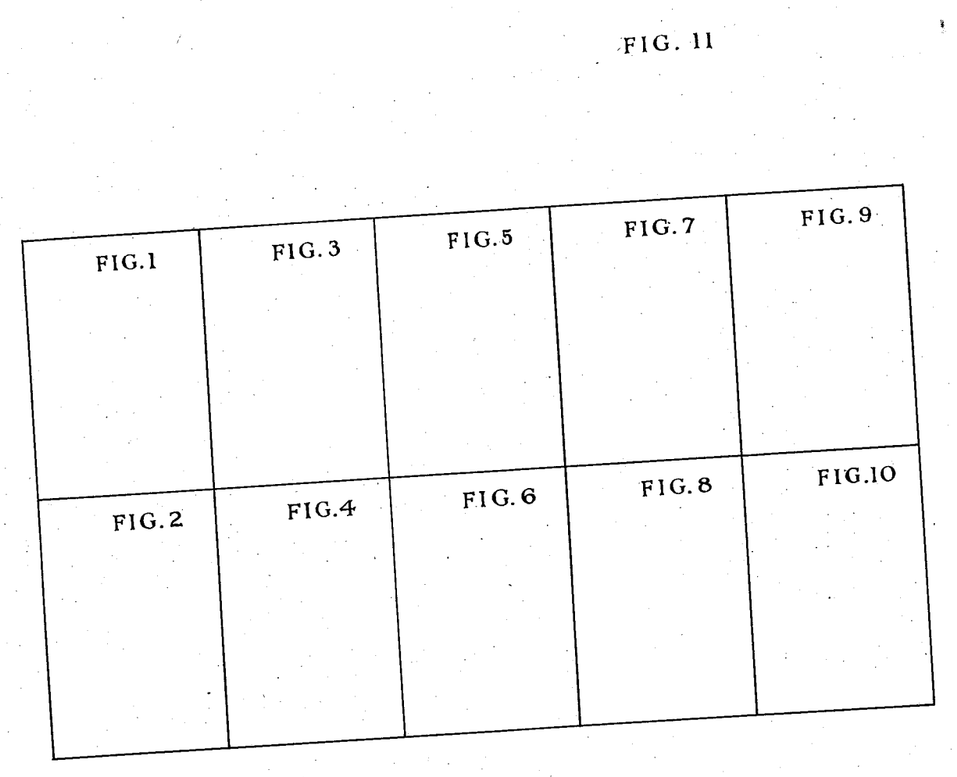
Fig. 11 is a key sheet showing how the circuit diagrams, Figures 1 to 10 inclusive, are put together in order that the circuits may be read in connection with the following description.

It will be understood that this applies to the relays of the tens counter, but the same combinations are effected in connection with the L relays of the units counter. Assuming that ten impulses are transmitted, relay P of the connector control circuit will be impulsed ten times. At the release of relay P at the beginning of the first impulse, a circuit is closed for operating relay K1 which extends from ground on conductor 15, lower back contact of relay P, conductor 49, upper back contact of relay K, inner upper back contact of relay K1, winding of relay K1 and resistance 51 to battery. A locking circuit is closed for relay K1 which includes its winding, its inner upper front contact and conductor 16 which is connected to ground on conductor 15 by way of the upper front contact of relay RS. Relay D is operated at the beginning of the first impulse over a circuit extending from ground. upper back contact of relay P, upper front contact of relay G and winding of relay D to battery. Since relay D is slow acting, it remains operated during the series of impulses and when it is operated it opens up the above described locking circuit of relay DT, this relay releases and removes dial tone from the calling line.

The above described circuit to relay K1 extends to relay K2 in multiple, but this latter relay is short circuited and prevented from operating by means of ground on conductor 49, extending through the inner upper back contact of relay K2 to the point between resistance 52 and its winding. When relay P is operated at the end of the first impulse, this short-circuiting ground is removed at the back contact of relay P and relay K2 is operated in multiple with relay K1.

At the beginning of the second impulse, relay P releases and closes a circuit for short-circuiting and releasing relay K1 which extends from ground on conductor 15, lower back contact of relay P, conductor 49, upper back contact of relay K, inner upper front contact of relay K2 to the point between resistance 51 and the winding of relay K1. Relay K2 is maintained in its operated position after relay K1 is released, over a circuit including the inner upper back contact of relay K1, upper back contact of relay K, conductor 49, lower back contact of relay P to ground on conductor 15.

The release of relay K1 effects the operation of relay K3 over a circuit extending from ground on conductor 16, middle upper back contact of relay K1, outer upper front contact of relay K2, outer upper back contact of relay K4 and winding of relay K3 to battery. A locking circuit is now closed for relay K3 which extends from ground on conductor 16, middle upper back contact of relay K5, middle upper front contact and winding of relay K3 to battery. When relay P is energized at the end of the second impulse, relay K2 is released by the opening of the lower back contact of relay P which removes ground from conductor 49.

During the remaining impulses, relay K1 and K2 are operated and released in the same manner above described, that is, at the beginning of each impulse, relay K1 is shifted from one position to another. At the beginning of each odd impulse, relay K1 is operated and locked and at the beginning of each even impulse, this relay is released, in the manner described in connection with the first two impulses. Relay K2 is shifted in position at the end of each impulse, being operated at the end of each odd impulse and released at the end of each even impulse, as described above in connection with impulses 1 and 2.

Relay K4 is operated at the beginning of the third impulse over a circuit extending from ground on conductor 16, outer upper front contact of relay K1, outer upper back contact of relay K5, outer upper front contact of relay K3 and winding of relay K4 to battery and this relay is locked over a circuit including its inner lower front contact and inner lower front contact of relay K3 to conductor 16.

Relay K5 is operated at the beginning of the fourth impulse over a circuit extending from ground on conductor 16, middle upper back contact of relay K1, outer upper front contact of relay K2, outer upper front contact of relay K4, outer upper back contact of relay K6 and winding of relay K5 to battery. Relay K5 is locked over a circuit including its inner lower front contact, middle upper front contact of relay K4 to ground on conductor 16. The operation of relay K5 transfers the above described locking circuit of relay K3 from the middle upper back contact to the middle upper front contact of relay K5.

At the beginning of the fifth impulse, relay K6 is operated over a circuit extending from ground on conductor 16, outer upper front contact of relay K1, outer upper front contact of relay K5 and winding of relay K6 to battery. Relay K6 closes a locking circuit for itself including its inner upper front contact and conductor 16. The operation of relay K6 transfers the locking circuit of relay K3 from the middle upper back contact to the middle upper front contact of relay K6.

At the beginning of the sixth impulse, relay K3 is released because its locking circuit including the middle upper front contact of relay K1 is opened, since this latter relay is released during each even impulse period. The release of relay K3 transfers the locking circuit of relay K4 from the inner upper front contact to the inner upper back contact of relay K3. Consequently, when relay K1 is operated at the beginning of the seventh impulse, this locking circuit is opened and relay K4 is released. The release of relay K4 transfers the locking circuit of relay K5 from the middle upper front contact to the middle upper back contact of relay K4 and since relay K1 is released during the eighth impulse period, relay K5 will be released during this period.

Relay K3 is energized at the beginning of the eighth impulse over a circuit extending from ground on conductor 16, middle upper back contact of relay K1, outer upper front contact of relay K2, outer upper back contact of relay K4 and winding of relay K3 to battery. A locking circuit for relay K3 now extends by way of its middle upper front contact, middle upper back contact of relay K5 and conductor 16. At the beginning of the ninth impulse, relay K4 is operated over a circuit extending from ground on conductor 16 outer upper front contact of relay K1, outer upper back contact of relay K5, outer upper front contact of relay K3 and winding of relay K4 to battery. Relay K4 is locked over a circuit including its inner upper front contact and inner upper front contact of relay K3 to conductor 16. The beginning of the tenth impulse (even) is effective to release relay K1 and at the end of this impulse, relay K2 is released. This impulse is ineffective to change the condition (operated) of relays J3, J4 and J6 over that described for the ninth impulse. However, after the ninth impulse is transmitted relays K1 and K2 are left operated which differs from the condition after the tenth impulse when these two relays are deenergized.

It will now be explained how the circuits function in response to the dialing of #2 for the tens digit. It will be recalled that relay D is operated at the beginning of the first impulse of the series. When impulse relay P remains energized at the end of the series of impulses, relay D is released. A circuit is now closed for operating relay K of the tens counter which extends from ground, lower front contact of relay G, back contact of relay D, conductor 53, inner lower front contact of relay K3, lower back contact and winding of relay K to battery. Relay K is locked operated over a circuit from ground on conductor 16, lower front contact and winding of relay K to battery.

Units digit is now transmitted and since it is assumed that two impulses are sent from the calling dial for this digit, relay P is again impulsed twice. The first impulse closes a circuit for operating relay L1 which extends from ground, on conductor 15, lower back contact of relay P, conductor 49, upper front contact of relay K, upper back contact of relay L, inner upper back contact of relay L1, winding of relay L1 and resistance 54 to battery. Relay L1 is locked operated by way of its inner upper front contact to ground on conductor 16. At the end of the first impulse, the operation of relay P effects the operation of relay L2 in the same manner described for the operation of relay K2 of the tens counter. At the beginning of the second impulse, the release of relay P releases relay L1 by short circuiting its winding by means of ground connected to conductor 49 which extends through the upper front contact of relay K, upper back contact of relay L and inner upper front contact of relay L2 to the point between resistance 54 and the winding of relay L1. The release of relay L1 closes a circuit for operating relay L3 which extends from ground on conductor 16, middle upper back contact of relay L1, outer upper front contact of relay L2, outer upper back contact of relay L4 and winding of relay L3 to battery. Delay L3 is locked to ground on conductor 16 by way of the middle upper back contact of relay L5, middle upper front contact and winding of relay L3 to battery. At the end of the second impulse, relay P is again operated and relay L2 is released because its locking circuit, including conductor 49, is opened at the lower back contact of relay P. It will be understood that relay D is again operated at the beginning of the transmission of the units digit and is released at the end of the series of units impulses. Relay L is operated at the end of the series of units impulses over a circuit extending from ground on conductor 15, lower back contact of relay D, conductor 53, inner lower front contact of relay L3, inner back contact and winding of relay L to battery. Relay L is locked operated to ground on conductor 15.

After the tens and units impulses have been transmitted, execution takes place, that is, the proper tens and units connecting magnets of the cross bar switch are operated and a test is made of the called line. The executing circuit is controlled by the operation of an X relay of the connector control lockout circuit of Fig. 9. Since it is assumed that the #2 connector control circuit is used on this call, relay X2 will be operated if no other connector control circuit is engaged in executing at this same time. Relay X2 is operated over a circuit extending from ground, on conductor 15, outer lower front contact of relay L, conductor 55, outer lower front contact of relay RS, winding of relay X2 and over the series circuit including back contacts of all relays in the group to battery through resistance 56. At the upper make-before-break contacts of relay X2, this relay is locked operated and the series circuit of other X relays is opened so that no other X relay of the group can be operated until relay X2 is released.

A circuit is now closed for operating relay LC of the discriminator, only if the LF relay of the discriminator is normal. This is to prevent the operation of the LC relay and the consequent operation of tens and units selecting magnets of the cross-bar switch on a terminating connection in the event of that relay LF is operated for controlling the operation of a tens and a units magnet on an originating connection. The circuit for operating relay LC extends from ground, inner lower front contact of relay X2, conductor 57, winding of relay LC and over a series circuit including the back contacts of relays LC and LF to battery through resistance 25. Relay LC closes a locking circuit for itself at its make-before-break front contacts and these back contacts open up the circuit to relay LF to prevent its operation at this time.

Since #22 was dialed, it now becomes necessary to operate tens magnet T2 and units magnet U2 of the cross-bar switch and then to operate the link magnet CL1 (since link #1 is used on this call) for connecting the link circuit through to the called line. Magnets T2 and U2 are operated over a circuit extending from ground, inner left-hand back contact of magnets T1 to T0 inclusive, middle back contact of magnet T2, winding of magnet T2, conductor 58, over common conductor 20 and by way of the cable including all ten of the tens magnet common conductors of the tens executing circuit EXT, leading from Fig. 1 to Fig. 10, outer lower front contact of relay K3, outer lower back contact of relay K6, outer lower back contact of relay K4, conductor 59, outer lower front contact of relay X2, conductor 61, inner lower front contact of relay LC, inner lower back contact of relay LF, conductor 62, front contact 63 of relay X2, conductor 64, outer lower back contact of relay L4, outer lower back contact of relay L6, outer lower front contact of relay L3, units conductor 2 and by way of the units executing cable EXU leading from Fig. 10 to Fig. 1, conductor 29, winding of magnet U2 and over the series circuit including the contacts of all units magnets to battery through resistance 29.

From the above explanation, it is believed that a clear understanding will be had of the executing circuits for the various numbers selected by dialing the various digits, since these executing circuits include conductors 59 and 64 which are selectively connected to the 10 tens common wires and to the 10 units common wires illustrated by conductors EXT and EXU respectively, as selected by the tens and the units counting relays respectively. It is not believed necessary to trace out these executing circuits in detail for the various digit combinations, since the above table showing the counting relays left operated when the various digits are dialed will indicate the various combinations of EXT and EXU wires which are selected.

The circuit is now closed for operating magnet CL1 which extends from ground, front contact of the operated T and U magnets in series (in this case T2 and U2), conductor 32, back contact of relay DS, conductor 65, front contact 66 of relay X2, conductor 67, front contact 68 of relay CS2, conductor 69, and winding of magnet CL1 to battery. It will be noted that this connection to ground also leads up to the point between resistance 47 and the winding of relay RS which functions to short circuit and release relay RS. A locking circuit is closed for magnet CL1 which includes conductor 39, to which ground is connected at this time through front contact 38 of relay CS2.

When magnet CL1 operates and closes contact set 24 for connecting link #1 to called line #22, a test is made to determine if the called line is busy or idle. This test period includes the time between the closure of contact set 24 by magnet CL1 and the release of relay RS effected by the closure of the circuit which operates magnet CL1. If the called line is busy, ground will be found on sleeve conductor S3 and extends over this conductor through lower front contact of contact set 24, conductor S4, outer lower back contact of relay LK, conductor 71, front contact 72 of relay CS2, conductor 73, inner lower front contact of relay RS and winding of busy relay BY to battery. Relay BY operates and closes a locking circuit for itself which includes its inner lower front contact and conductor 15. The operation of relay BY prevents the operation of relay R of the link circuit by opening the circuit of relay R at the outer lower back contact of relay BY. The failure of relay R to operate prevents the connection of the link circuit to the called line talking conductors and also prevents the release of the connector control circuit in a manner which will be later described. Relay BY connects the source of busy tone by way of its upper front contact and condenser 46 to calling line conductor T3. It will thus be seen by that, on a call to a busy line, the connector control circuit and the link circuit are held until the calling party releases. The release of the connector control circuit is effected by the release of relays P and G when the calling party hangs up the receiver, in a manner which will be described in connection with the release of the connector control circuit by the release of relays P and G on a call to an idle line, which release is controlled from the link circuit.

Connector link circuit operation

It will now be assumed that the called line is idle, in which case relay BY is not operated but relay R of the link circuit is operated over a circuit extending from ground on conductor 15, outer lower front contact of relay L, conductor 55, outer lower back contact of relay RS, outer lower back contact of relay BY, conductor 74, front contact 75 of relay CS2, conductor 76 and winding of relay R to battery. Relay R closes a locking circuit for itself extending from ground, front contact 38 of relay CS2, conductor S1, outer lower front contact and winding of relay R to battery.

The release of relay RS of the connector control circuit removes ground from locking conductor 16, which is effective to release relays K and K3 of the tens counter and relay L3 of the units counter. The opening of the outer lower front contact of relay RS also effects the release of relay X2 and the release of relay X2 removes ground from conductor 57 which is effective to release relay LC. Magnets T2 and U2 of the connector switch are released when relay X2 releases and opens its lower front contact and its front contact 63 included in the operating circuit for these magnets. This circuit is also opened by the release of the K and L relays of the tens and units counters. It will be understood that contact set 24 is held operated by means of magnet CL1 until the release of the connection and that contact set 14 of the finder portion of the switch is held operated by magnet FL1 until the connection is released.

The operation of relay R opens up the circuit including conductors T2 and R2 and T3 and R3 extending to relay P of the connector control circuit which is effective to release relays P and G in sequence. The relase of relay P closes a circuit for again operating relay D and this circuit is opened when relay G releases, but the operation of relay D at this time performs no function. The operation of relay R extends the calling line circuit, including conductors T1 and R1, by way of the make-before-break front contacts of relay R to the windings of relay A and this latter relay is operated.

Relay R connects ground by way of its inner upper front contact and outer lower back contact of relay LK to conductor S4 which extends through contact set 24 to conductor S3 of the called line for operating relay 2CO of the called line circuit and for making this line busy to other calls. Relay A applies ground through its upper front contact to conductor S1 which extends through contact set 14 to conductor S of the calling line for holding the cut-off relay of this line energized and for making the calling line busy.

The release of relay G of the connector control circuit removes ground from the master ground conductor 15 which is effective to release relay L of the units counter and relay CS2 of the link circuit. When relay CS2 removes ground from conductor 39 at contact 38, magnets FL1 and CL1 are locked to ground by way of conductors 39, 51 and front contact of relay A.

Figure 8:
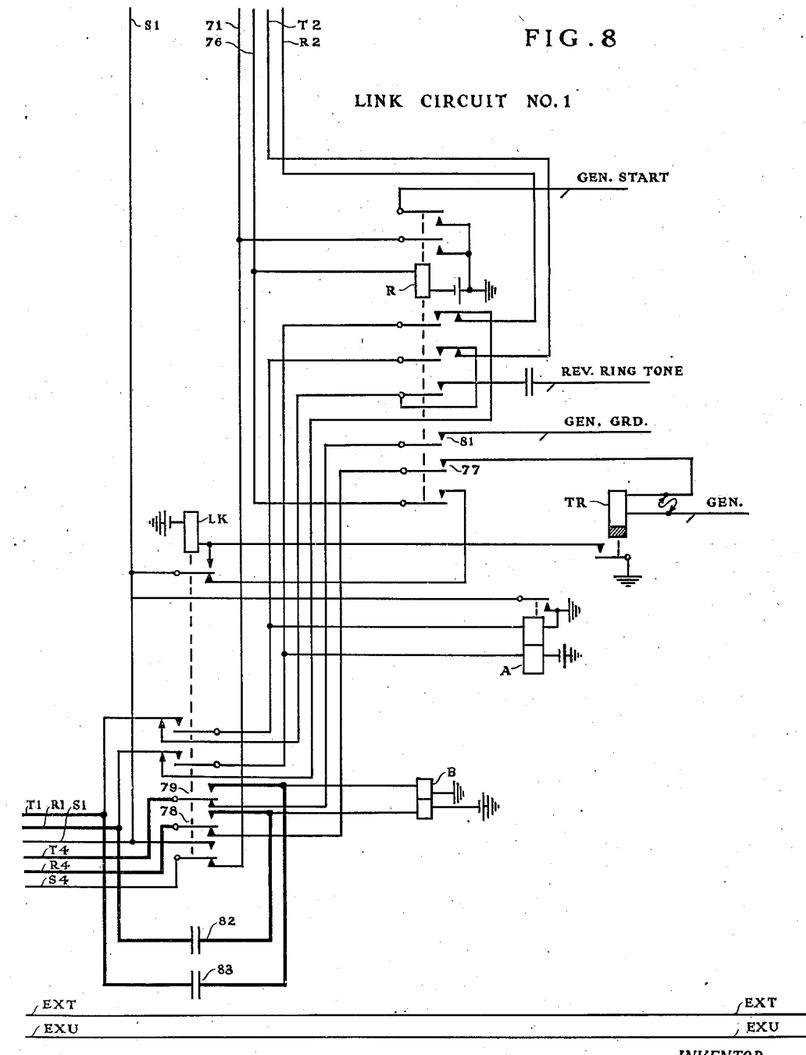

The operation of relay R connects ground by way of its outer upper front contact to the common generator start conductor for starting the generator in the event that this is the only connection calling for ringing current. The release of relay CS2 opens up the above described operating circuit of relay CB2 of the connector control allotter and this latter relay is released to render the #2 connector control circuit again selectable. The called line now receives ringing current over a circuit extending from generator GEN, winding of trip relay TR, front contact 77 of relay R, back contact 78 of relay LK, conductor R4, through contact set 24, conductor R3 and over the called sub-station to conductor T3, through contact set 24, conductor T4, back contact 79 of relay LK and front contact 81 of relay R to the other side of the generator. When the called party answers, relay TR is operated to close a circuit for operating relay LK which is locked by way of its inner lower front contact to ground on conductor S1 which comes from the front contact of relay A. The opening of the inner lower back contact of relay LK opens up the locking circuit of relay R, this relay is released and by the opening of its front contacts 77 and 81, generator is disconnected from the called line and relay TR is released.

Conversation now takes place with battery being fed to the calling line through the windings of relay A by way of the make-before-break front contacts of relay LK and battery being fed to the called line by way of impedance coil B and front contacts 78 and 79 of relay LK, with these two lines being connected in a conversational circuit by means of condensers 82 and 83.

The connection is released by the calling party hanging up the receiver which effects the release of relay A and the consequent release of relay LK. Ground is removed from conductor S1 for releasing relay 1CO of the calling line by the opening of the front contact of relay A and this front contact also removes ground from conductor S4 which effects the release of relay 2CO of the called line.

Magnet FL1 of the line finder is released when ground is removed from conductor 39, connected to conductor S1 in Fig. 7. Magnet CL1 of the connector is likewise released when ground is removed from conductor 39. Since conductor 39 is extended by way of the front contact of magnet FL1 to the lower winding of relay LB1, this relay will be released unless it is locked by way of its upper winding in the manner previously described.

Having thus described a new and novel system for using a three-dimensional cross-bar switch as a line finder and as a line connector, together with the circuits which cooperate in providing telephone connections in such a system as one specific embodiment of the present invention, it is desired to be understood that this particular form is selected to facilitate in the disclosure of the invention rather than to limit the number of forms which it may assume; and it is to be further understood that various modifications, adaptations and alterations may be applied to the specific form shown to meet the requirements of practice without in any manner departing from the spirit or scope of the present invention except as limited by the appended claims.

What is claimed is:

1. In a telephone system, a cross-bar switch, lines, double ended link circuits, contact sets in said switch, movable bars in said switch arranged in three intersecting planes, means for selectively operating a bar in each plane for selectively operating certain ones of said contact sets for selectively connecting one end of said link circuits to said lines, and means for selectively operating a bar in each plane for selectively operating certain others of said contact sets for selectively connecting the other end of said link circuits to said lines.

2. In a telephone exchange system in which inter-connections between incoming lines and outgoing lines are established by way of trunk lines through the medium of a single cross-bar switch; the method of establishing inter-connections which consists in preparing mechanical linkages for said inter-connections in accordance with the identity of the incoming lines by means of a first pair of line marking cross-bars in said switch and in accordance with the identity of the outgoing lines by means of a second pair of line marking cross bars in said switch, one of said first pair and one of said second pair being the same cross bar; and completing said linkages by means of a third pair of trunk marking cross bars.

3. In a telephone exchange system in which inter-connections between incoming lines and outgoing lines are established by way of trunk lines through the medium of a single cross-bar switch; the method of establishing inter-connections which consists in preparing mechanical linkage for said inter-connections in accordance with the identity of the incoming lines by means of a first pair of line marking cross-bars in said switch and in accordance with the identity of the outgoing lines by means of a second pair of line making cross-bars in said switch; and completing said linkages by means of a third pair of trunk marking cross bars.

4. In a telephone system, a calling line, a called line, a plurality of connector link circuits, a plurality of connector control circuits, a connector link allotter for allotting one of said connector link circuits for use by said calling line, a connector control circuit allotter for allotting one of said connector control circuits for use by said calling line, a cross bar switch and a relay selector associated therewith, means controlled over said calling line for causing said relay selector to operate said cross-bar switch to connect said calling line to an allotted connector control circuit, and means controlled over said calling line for causing said connector control circuit to operate said cross-bar switch to complete a connection to said called line by way of said allotted one of said connector link circuits.

5. In a telephone system, a cross-bar switch, a group of lines and a plurality of trunks appearing in the contact sets of said switch, a plurality of units magnets each common to all lines of said group having the same units digit, a plurality of tens magnets each common to all lines of said group having the same tens digit, a pair of trunk magnets associated with each of said trunks, means controlled over a calling line for operating the units and tens magnets common to that line and one of said trunk magnets associated with an idle trunk whereby only the contact set of said switch is operated which connects said idle trunk to said calling line, and means controlled over said calling line for operating the units and tens magnets common to a called line and the other of said pair of trunk magnets whereby only the contact set of said switch is operated which connects said idle trunk to said called line.

6. In a telephone system, a first calling and a first called line, a control circuit, a single three-dimensional cross-bar switch and a relay selector associated therewith, means controlled over said first calling line for causing said relay selector to select said control circuit, means controlled over said first calling line for causing said control circuit to effect a connection between said first calling line and said first called line by way of said single cross-bar switch, and means for disconnecting said relay selector from said control circuit whereby said control circuit is available for use for effecting another connection between a second calling line and a second called line by way of said single cross-bar switch.

7. In a telephone system in which lines are selectively connected to form conversational circuits, a cross-bar switch having a plurality of contact sets, bars movable in three intersecting planes, means for first selectively operating a bar in each of said three planes for selectively operating one of said contact sets, means for thereafter selectively operating a bar in each of said three planes for selectively operating another of said contact sets, and means for electrically connecting said contact sets together to form a complete conversational circuit in which the only selective connections between the lines forming the conversational circuit are within said cross-bar switch.

8. In a telephone system in which lines are selectively connected to form conversational circuits, a cross-bar switch having a plurality of contact sets, bars movable in three intersecting planes, means for first selectively operating a bar in each of said three planes for selectively operating one of said contact sets, means for thereafter selectively operating a bar in each of said three planes for selectively operating another of said contact sets, means for electrically connecting said contact sets together to form a complete conversational circuit in which the only selective connections between the lines forming the conversational circuit are within said cross-bar switch, means for releasing all bars except a pair in one of said planes, and means controlled by said pair of bars for maintaining said contact sets operated whereby said conversational circuit is maintained intact after the release of said bars.

9. In a telephone system, a cross-bar switch, a plurality of incoming lines, a plurality of outgoing lines, a link circuit, a first set of bars movable in a first direction, a second set of bars movable in a second direction, a third and a fourth bar associated with said link circuit and each independently movable in a third direction, means for selectively operating any one bar in each of said first and said second sets in combination with said third bar for selectively connecting any one of said incoming lines to said link circuit, and means for concomitantly selectively operating any one bar in each of said first and second sets in combination with said fourth bar for selectively connecting said link circuit to any one of said outgoing lines.

10. In a telephone system, a cross-bar switch, a plurality of incoming lines, a plurality of outgoing lines, a link circuit, a first set of bars movable in a first direction, a second set of bars movable in a second direction, a third and a fourth bar associated with said link circuit and each independently movable in a third direction, means for selectively operating any one bar in each of said first and said second sets in combination with said third bar for selectively connecting any one of said incoming lines to said link circuit, means for concomitantly selectively operating any one bar in each of said first and second sets in combination with said fourth bar for selectively connecting said link circuit to any one of said outgoing lines, and means for preventing the operation of any of said first and second sets of bars in combination with said fourth bar while said first and second sets of bars are operated in combination with said third bar.

11. In a telephone system, a cross-bar switch, a plurality of incoming lines, a plurality of outgoing lines, a link circuit, a first set of bars movable in a first direction, a second set of bars movable in a second direction, a third and fourth bar associated with said link circuit and each independently movable in a third direction, means for selectively operating any one bar in each of said first and said second sets in combination with said third bar for selectively connecting any one of said incoming lines to said link circuit, means for concomitantly selectively operating any one bar in each of said first and second sets in combination with said fourth bar for selectively connecting said link circuit to any one of said outgoing lines, and means for preventing the operation of any one said first and second sets of bars in combination with said third bar while said first and second sets of bars are operated in combination with said fourth bar.

THERON LORIMER BOWSER.